US008757472B2

(12) United States Patent
Egan

(10) Patent No.: US 8,757,472 B2
(45) Date of Patent: Jun. 24, 2014

(54) METHOD FOR JOINING SIC-DIAMOND

(76) Inventor: David Patrick Egan, Shannon Airport (IE)

( * ) Notice: Subject to any disclaimer, the term of this patent is extended or adjusted under 35 U.S.C. 154(b) by 428 days.

(21) Appl. No.: 12/669,285

(22) PCT Filed: Jul. 17, 2008

(86) PCT No.: PCT/IB2008/052878
§ 371 (c)(1),
(2), (4) Date: Mar. 31, 2010

(87) PCT Pub. No.: WO2009/010934
PCT Pub. Date: Jan. 22, 2009

(65) Prior Publication Data
US 2010/0203341 A1    Aug. 12, 2010

(30) Foreign Application Priority Data
Jul. 17, 2007  (ZA) .................................. 2007/05939

(51) Int. Cl.
*B23K 31/02*       (2006.01)
*B23K 20/24*       (2006.01)

(52) U.S. Cl.
USPC ........................................ 228/122.1; 228/206

(58) Field of Classification Search
USPC ......... 228/122.1, 124.1, 124.5; 428/627, 634, 428/632, 633
See application file for complete search history.

(56) References Cited

U.S. PATENT DOCUMENTS

| 4,124,401 | A | 11/1978 | Lee et al. |
| 4,167,399 | A | 9/1979 | Lee et al. |
| 4,220,455 | A | 9/1980 | St. Pierre et al. |
| 4,242,106 | A | 12/1980 | Morelock |
| 4,247,304 | A | 1/1981 | Morelock |
| 4,353,953 | A | 10/1982 | Morelock |
| 4,381,271 | A | 4/1983 | Hayden |
| 4,417,906 | A | 11/1983 | Ohno |
| 4,448,591 | A | 5/1984 | Ohno |
| 4,453,951 | A | 6/1984 | Ohno |
| 4,459,328 | A * | 7/1984 | Mizuhara ...................... 427/192 |
| 4,460,382 | A | 7/1984 | Ohno |
| 4,465,650 | A | 8/1984 | Ohno |
| 4,483,892 | A | 11/1984 | Ohno |
| 4,497,639 | A | 2/1985 | Ohno |
| 4,544,517 | A | 10/1985 | Ohno |
| 4,561,810 | A | 12/1985 | Ohno |
| 4,601,423 | A | 7/1986 | Pipkin et al. |
| 4,605,343 | A | 8/1986 | Hibb, Jr. et al. |
| 4,664,705 | A | 5/1987 | Horton et al. |
| 4,698,070 | A | 10/1987 | Ohno |
| 4,871,108 | A * | 10/1989 | Boecker et al. ............ 228/122.1 |
| 4,874,398 | A | 10/1989 | Ringwood |
| 4,948,388 | A | 8/1990 | Ringwood |
| 4,985,051 | A | 1/1991 | Ringwood |
| 5,037,704 | A * | 8/1991 | Nakai et al. .................... 428/550 |
| 5,106,393 | A | 4/1992 | Ringwood |
| 5,370,195 | A | 12/1994 | Keshavan et al. |
| 5,500,248 | A | 3/1996 | Iacovangelo et al. |
| 5,647,878 | A | 7/1997 | Iacovangelo et al. |
| 5,804,321 | A * | 9/1998 | Thorpe et al. ................. 428/623 |
| 5,807,032 | A * | 9/1998 | Abe ............................. 407/118 |
| 5,874,175 | A * | 2/1999 | Li ................................. 428/457 |
| 6,179,886 | B1 | 1/2001 | Gordeev et al. |
| 6,213,380 | B1 * | 4/2001 | Collins et al. ............... 228/122.1 |
| 6,280,584 | B1 * | 8/2001 | Kumar et al. ............. 204/298.15 |
| 6,447,852 | B1 | 9/2002 | Gordeev et al. |
| 6,709,747 | B1 | 3/2004 | Gordeev et al. |
| 6,840,429 | B2 * | 1/2005 | Wolfgram et al. ......... 228/124.5 |
| 6,868,848 | B2 | 3/2005 | Boland et al. |
| 6,939,506 | B2 | 9/2005 | Qian et al. |
| 7,008,672 | B2 | 3/2006 | Gordeev et al. |
| 8,061,454 | B2 * | 11/2011 | Voronin et al. ................ 175/426 |
| 2002/0034632 | A1 | 3/2002 | Griffin et al. |
| 2004/0155336 | A1 * | 8/2004 | Yamaguchi et al. .......... 257/736 |

(Continued)

FOREIGN PATENT DOCUMENTS

EP    0 223 585 A    5/1987
EP    0 439 017 A    7/1991

(Continued)

OTHER PUBLICATIONS

Examination report issued by European Patent Office for corresponding European application 08789343.4 dated Sep. 19, 2012.

(Continued)

*Primary Examiner* — Kiley Stoner
*Assistant Examiner* — Carlos Gamino
(74) *Attorney, Agent, or Firm* — Frommer Lawrence & Haug LLP; Ronald R. Santucci

(57) ABSTRACT

The invention relates to a method for joining ceramic composite parts comprising at least one ceramic material and at least one superhard material to at least one other part, the method comprising treatment of a joining surface or surfaces of the ceramic composite part; and disposition onto the treated surface or surfaces, or portions thereof, of a material capable of bonding to the ceramic composite part as well as to the at least one other part upon the application of sufficient heat. The invention extends to articles comprising a ceramic composite part comprising ceramic material and at least one superhard material, bonded to at least one other part, the article including at least one layer selected from an attachment layer, a brazeable layer, and an oxidation resistant (braze compatible) layer or combinations thereof included at an interface between the ceramic composite part and the other part.

3 Claims, No Drawings

(56) References Cited

U.S. PATENT DOCUMENTS

| | | | |
|---|---|---|---|
| 2004/0238946 A1 | 12/2004 | Tachibana et al. | |
| 2007/0119907 A1* | 5/2007 | Rodhammer | 228/122.1 |
| 2008/0206576 A1 | 8/2008 | Qian et al. | |

FOREIGN PATENT DOCUMENTS

| | | | | |
|---|---|---|---|---|
| EP | 1 561 737 A | 8/2005 | | |
| EP | 1 930 306 A | 6/2008 | | |
| EP | 1 626 944 B | 7/2009 | | |
| JP | 62-24893 A | 2/1987 | | |
| JP | 62024893 A * | 2/1987 | | B23K 35/30 |
| JP | 62-120903 A | 6/1987 | | |
| JP | 63-24002 A | 2/1988 | | |
| JP | 1-96073 A | 4/1989 | | |
| JP | 4-193406 A | 7/1992 | | |
| JP | 06-199571 | 7/1994 | | |
| JP | 7-150878 A | 6/1995 | | |
| JP | 8-85012 A | 4/1996 | | |
| JP | 2002-525262 A | 8/2002 | | |
| JP | 2004-158726 A | 6/2004 | | |
| RU | 2 036 779 C | 6/1995 | | |
| RU | 2 064 399 C | 7/1996 | | |
| WO | WO 00/18702 A | 4/2000 | | |
| WO | WO 00/34001 A | 6/2000 | | |
| WO | WO 02/24603 A | 3/2002 | | |
| WO | WO 2004/007401 A | 1/2004 | | |
| WO | WO 2009/010934 A | 1/2009 | | |
| WO | WO 2009/013713 A | 1/2009 | | |
| WO | WO 2009/080009 A | 7/2009 | | |

OTHER PUBLICATIONS

Official action issued by Japanese Patent Office for related application JP 2010-516638, mailing date of action is Feb. 22, 2013, English translation of official action.

Office action issued by Japanese Patent Office for corresponding Japanese application 2010-516638, dated Aug. 13, 2013 with English translation.

Official action issued by European Patent Office, dated Nov. 7, 2013, for corresponding European application 12 175 173.9.

Examination report issued by European Patent Office for corresponding European divisional application 12175173.9 dated Nov. 30, 2012.

* cited by examiner

METHOD FOR JOINING SIC-DIAMOND

This application is a 371 of PCT/IB2008/052878 filed on Jul. 17, 2008, published on Jan. 22, 2009 under publication number WO 2009/010934 A and claims priority benefits of South African Patent Application No. 2007/05939 filed Jul. 17, 2007, the disclosure of which is incorporated herein by reference.

INTRODUCTION

This invention relates to a method for joining ceramic composite parts comprising at least one ceramic material and at least one superhard material to at least one other part. In particular, this invention relates to a method for joining silicon carbide diamond composites to other materials and to materials and tools including such joined materials.

BACKGROUND TO THE INVENTION

Ceramics, such as SiC, $Si_3N_4$, $Al_2O_3$, ZrO, for example, are materials that are typically hard, refractory and relatively chemically inert and are accordingly used in a range of applications such as wear-resistant parts, ballistic armour, cutting tools and electronics. The incorporation of superhard phases such as diamond and cubic boron nitride (cBN) into ceramic material can significantly increase the average hardness, abrasion resistance and thermal conductivity of the composite material. For example, U.S. Pat. No. 6,447,852 and U.S. Pat. No. 6,709,747 disclose a type of material comprising SiC and diamond as well as a small amount of silicon and other materials and a method for making same. Various forms of this material comprise different volume fractions and size distributions of diamond, with the formulation capable of being designed specifically for various applications. Applications of this material are as diverse as the thermal management of electronic devices, nozzles for water-jets and inserts for rock drilling bits. The shapes of the ceramic-diamond composite parts used in these and other applications can be complex, and almost always need to be joined to at least one other part to form an integrated component. The strength of such joins needs to be very high in certain applications, such as rock drilling, so that the ceramic-diamond composite part does not become detached from the component during operation.

The high-strength joining of ceramic material components to other components is a sophisticated and specialised art and typically does not lend itself to conventional joining techniques such as brazing by gas torch in air, for example. Limited success can be achieved by using highly specialised reactive brazes that have been specially designed for ceramics and for which special atmospheres may be needed. Such methods are typically relatively expensive and not well suited to mass production or to cost-sensitive applications.

The use of brazing to join parts is well known in the art, as is the treatment of the joining surfaces of the parts to be joined. The braze alloys comprise materials with lower melting points than those of either part to be joined. The braze alloys are typically in foil or paste for and can be disposed onto one or both of the parts to be joined prior to formation of the join. Compatible fluxes are also generally needed. The surfaces of the parts that are involved in the join are referred to here as the "join surface" or "joining surface" and those terms are equivalent in meaning and used interchangeably herein.

ScD material can be described as material comprising diamond particles bonded within a matrix of silicon carbide. There exist various teachings in the art directed to such material including U.S. Pat. No. 6,709,747, U.S. Pat. No. 6,447,852 and U.S. Pat. No. 6,868,848, all of which are included herein by reference.

As ScD material is relatively new, there exists no substantive teachings in the art relating to the attachment of ScD material to a structural metal. In the joining of ceramics, active brazing is well known in the art. Below is extract from 'Vacuum brazing of ceramics and graphite to metals' by H. R. Prabhakara Bangalore Plasmatek Pvt.Ltd, 129, Block-14, Jeevanmitra Colony I-Phase, Bangalore 560 078

> But joining of ceramics to metals and to themselves is not straight forward. There are basically two problems. First, the usual brazing fillers do not wet the surfaces of ceramics. Second, there is a big difference in the thermal expansion coefficients of metals and ceramics. This induces tremendous stresses in the brazing process which can lead to cracking. Special techniques have been developed for brazing ceramics. Moly-manganese metallisation is the standard practice for brazing ceramics. Here a paint of the refractory metal molybdenum with 10% manganese is applied to the ceramic and sintered around 1400° C. In this process manganese oxidises and diffuses into ceramic forming transition layer between the ceramic and the molybdenum layer. This reduces the thermal mismatch between ceramic and molybdenum. It is then protected from oxidation by plating with nickel. Brazing is then carried out using conventional filler materials either in vacuum or in an inert atmosphere.
>
> Active brazing is a relatively new technique. A family of brazing alloys called active brazing alloys are made by adding a small percentage of titanium or vanadium to conventional filler material compositions. Brazing is carried out under high vacuum in clean conditions. During brazing titanium is oxidised by the ceramic forming titanium oxides and liberating some aluminium atoms. This interlayer forms some kind of chemical bridge between the ceramic and the metal. An alternate way is to have a titanium coating on the ceramic and then carry out regular brazing. At high temperatures titanium reacts well with ceramics as well as other metals. Usual brazing alloys wet titanium surface well leading to a good brazed joint. In terms of the brazing of ultrahard materials to a tool, the method known in the art is to use an active braze (containing a carbide former: Ti, Cr, Mo etc; such as TiCuSil) and heating to melting under a high vacuum, $<10^{-5}$ mBar.

The joining of composite materials comprising ceramic materials and superhard materials is typically further complicated by the presence of the superhard material, the surface region of which may undergo a phase change during the formation of the composite, especially if the process involves the application of heat, as is typically the case. This is because the superhard phases are typically metastable at the pressure conditions usually used for such processes and readily convert to softer phases at elevated temperatures. For example, diamond tends to convert to graphite (or "graphitise") at above about 700 degrees centigrade (° C.) in air. The join surface of such materials therefore typically comprises exposed superhard material (such as diamond), with at least a portion of the surface of this material having converted to a softer phase (such as graphite), as well as exposed ceramic material. Any exposed graphite or other soft phases at the join surface will tend to reduce the strength of the join. Any joining method that involves the application of substantial heat, especially in air, runs the risk of further converting the exposed metastable superhard phase to the softer phase.

U.S. Pat. Nos. 5,500,248 and 5,647,878 teach diamond tool inserts brazeable in air. The teachings of these references are not optimised to joining of ceramic and superhard material containing parts.

A need therefore exists for a method of joining ceramic composite parts comprising at least one ceramic material and at least one superhard material to at least one other part.

SUMMARY OF THE INVENTION

According to a first aspect to the present invention there is provided a method for joining ceramic composite parts comprising at least one ceramic material and at least one superhard material to at least one other part, the method comprising the following steps, treatment of a join surface or surfaces of the ceramic composite part; and disposition onto the treated surface or surfaces, or portions thereof, of a material capable of bonding to the ceramic composite part as well as to the at least one other part upon the application of sufficient heat.

The treatment may be to roughen, etch or otherwise increase the surface area of the join surface of the ceramic composite part.

Preferably the method is applicable in an oxidising environment. Most preferably the resultant strength of the bond between the ceramic composite part and at least one other part is similar to or greater than that of the strength of the bond between the superhard material and the ceramic material in the ceramic composite part.

Preferably the ceramic composite part comprises a ceramic phase, including oxides, carbides, nitrides and mixtures thereof, preferably a carbide ceramic, most preferably SiC. The superhard material is preferably diamond, although it will be appreciated that other superhard materials such as cBN, PcBN and/or PCD may be used.

In one embodiment of the present invention treatment of the join surface of the ceramic composite part comprises treatment with an acid or combination of acids such that exposed ceramic material at the join surface or surfaces is roughed (etched) (i.e. the exposed super hard surface area on the join surface is increased, as measured by any method well known in the art). Additionally, where the superhard material is diamond, any graphite present on an exposed diamond surface or surfaces may be substantially removed Preferably the surface treatment is conducted in two stages. Firstly, an acid selected from HCl, $H_2SO_4$, HF and $HNO_3$ may be used to roughen or etch the non-diamond portion of the join surface (e.g. the exposed SiC). Preferably HF is used and may be heated. This is preferably followed by treatment with a hot (20-150° C.) second acid selected from strongly oxidising acids, e.g. chromic acid, fuming sulphuric and solid KNO3 and/or HClO4. Fusion (NaOH+KNO3) may also be used although a straight wet chemical method preferably chromic acid is most preferably used. This second step is aimed at removing any graphite that might be present at the join surface and at the exposed diamond surfaces, in particular, where the superhard material is diamond.

Preferably the material disposed on the treated surface(s) comprises distinct layers of material which may be applied in sequence onto the join surface. These layers may be one or more of:

i) an attachment layer,
ii) a brazeable layer, and
iii) an oxidation resistant (braze compatible) layer.

Where the superhard material is diamond, the attachment layer preferably includes a carbide (most preferably TiC, but also any chemically bonded carbide such as chromium carbide) grown onto a portion of the exposed diamond surface(s) at the join surface. The carbide, preferably TiC, may be applied to a substantial portion of the join surface by means a conventional chemical vapour deposition (CVD) method known in the art. This will result in any exposed diamond being coated by and chemically bonded to carbide, preferably TIC, layer.

The attachment layer is preferably sufficiently thick to form a strong bond (e.g. at least 0.1 micron, preferably at least 0.2 micron, more preferably at least 0.3 micron, most preferably at least 0.4 micron) and not so thick that it flakes off (e.g. less than about 8 microns, preferably less than about 7 microns, more preferably less than about 6 microns, most preferably less than about 5 microns).

The brazeable layer is preferably applied to the join surface after the attachment layer. The brazeable layer is preferably comprised of a material formulation selected to bond well with the attachment layer and most preferably includes a refractory metal selected from W, Mo, Cr, Ni, Ta, Au, Pt, Pd, Nb or any combination or alloy thereof, (most preferably W) deposited onto the attachment layer disposed onto (included on) a substantial portion of the exposed superhard surface(s) at the join surface, as well as onto a substantial portion of any part of the join surface not coated with the attachment layer. Preferably tungsten metal is used as the brazeable layer because of its well-known affinity for being wet by molten brazes and its high melting point, which ensures that it will not be removed or deformed at an elevated temperature that might be required for subsequent brazing. Molybdenum is an alternative material suitable for the brazeable layer. The tungsten layer should be at least about 0.1 micron, preferably at least 0.5 microns thick and less than about 20 micron, preferably less than 10, more preferably less than 2 microns thick. A standard physical vapour deposition (PVD) method known in the art may be used to deposit the tungsten layer. Alternatively, the tungsten may be applied by CVD.

Since materials typically suitable for use in the brazeable layer, such as tungsten and molybdenum, may be prone to surface oxidation at brazing temperatures and may also by affected by fluxes used with the brazes (which would reduce their wettability by molten brazes), a further oxidation resistant layer including elements selected from Ag, Sn, Au, Pt (but preferably Ag) or alloys thereof, either with each other and/or with other metals, alloys such as bronze or brass or braze alloy may be deposited onto the brazeable layer. This is in order to prevent the surface oxidation effects from affecting the brazeability of the article. PVD may be used to deposit the oxidation resistant (Ag) layer. Alternatively, a wet chemical silver deposition technique may be used.

The oxidation resistant (Ag) layer should preferably be wettable by the braze and be substantially thick.

The brazeable layer should preferably be wettable by the braze, be substantially thick and not alloy extensively with the braze.

According to a second aspect to the present invention there is provided an article comprising a ceramic composite part comprising ceramic material and at least one superhard material, bonded to at least one other part, the article including at least one layer selected from:
i) an attachment layer,
ii) a brazeable layer, and
iii) an oxidation resistant (braze compatible) layer
or combinations thereof included at an interface between the ceramic composite part and the other part.

Preferably a join surface of the ceramic composite part has been treated to roughen, etch or otherwise increase the surface area of the join surface.

Preferably the article is an insert for use in roller cone, rotary drill bits, percussion drill bits or a pick where at least a portion of a working surface of the insert consists of ceramic composite (ScD) material. A top portion of the insert may be symmetrical or asymmetrical.

Alternatively the article may be a PDC type shear cutting insert where at least a portion of the working surface of the insert consists of ScD.

Alternatively the article may be an insert for gauge protection where at least a portion of the working surface of the insert consists of ScD.

Preferably the insert is a shaped insert. The insert may include a substantially cylindrical body portion and a substantially chisel-shaped top portion.

Alternatively, the insert may include a substantially cylindrical body portion and a substantially semi-round top portion.

Alternatively the insert may include a substantially cylindrical body portion and a substantially bullet shaped top portion.

The insert may include a substantially cylindrical body portion and a substantially symmetrical or asymmetrical top portion.

According to a third aspect of the present invention there is provided a wear resistant component comprising a metallic body portion bonded to a ceramic composite portion at an interface, the ceramic composite portion comprising a superhard material and a ceramic material wherein a dual layer is bonded to a surface of the ceramic composite portion proximate the interface, the dual layer comprising a first carbided layer of a carbide forming element and a second layer of a high melting point metal selected from W, Mo, Cr, Ni, Ta, Au, Pt, Pd or any combination or alloy thereof, the second layer being substantially free of carbide forming element from the first layer.

According to a fourth aspect of the present invention there is provided a wear resistant component comprising a metallic body portion bonded to a ceramic composite portion at an interface, the ceramic composite portion comprising a superhard material and a ceramic material wherein a first carbided layer of a carbide forming element and a second layer comprising a metal selected from W, Mo, Cr, Ni, Ta, Au, Pt, Pd or any combination or alloy thereof is present intermediate surfaces of the metal portion and the ceramic composite portion at the interface.

Preferably the second layer is bonded to the first layer, and the first layer is bonded to a surface of the ceramic composite portion.

Preferably the carbide forming element is selected from Ti, Cr and Mo.

Preferably the high melting point metal is W.

Preferably the superhard material is diamond and the ceramic material comprises SiC.

Preferably the thickness of the first carbided layer is at least about 0.1 micron, preferably at least about 0.3 micron, most preferably about 0.4 micron and less than 20 micron, preferably less than 10 micron, more preferably less than 5 micron. The average thickness of the first carbided layer may be from 0.1 to 1 micron, more preferably 0.3 to 1 micron and most preferably 0.4 to 1 micron.

Preferably the carbide forming element of the first layer is not substantially present at the interface other than in carbide form.

Preferably the metallic body portion of the wear resistant component comprises tungsten carbide or steel, most preferably tungsten carbide.

Preferably the surface of the ceramic composite portion proximate the interface is substantially free of graphite or other non-diamond carbon.

Preferably the wear resistant component is a tool, which is preferably a rotary drilling bit, an attack tool or a pick.

The prior art does not teach the step of treatment a join surface or surfaces of the ceramic composite part which step results in significant advantages for materials focussed on.

In addition, the present invention teaches that when a ceramic present is present in part to be joined, the TiC layer is separated from the brazeable layer. The prior art does not positively teach separate layers. In the prior art, the TiC layer is very thin (0.1 micron) with the presence of uncarbided Ti mixed in with W. The present invention teaches a 'thick' TiC layer which results in improved stress management at an interface with the superhard material. In addition, the present invention results in improved protection of the superhard phase such as diamond from the braze material. Finally, following the teachings of the present invention allows for a greater degree of freedom of choice in the brazeable layer. In particular, the choice of brazeable layer is decoupled from other prevailing conditions to a much greater extent.

The invention will now be described with reference to the following non-limiting example.

EXAMPLE

A SiC-diamond composite material part comprising 60 vol % diamond (ScD material 020902-C SNMN4404) is joined to a part comprising cemented tungsten carbide (5 mm×5 mm cubes cut from a plate of 8% Co in WC used as a wear surface).

Surface Preparation

The join surface of the SiC-diamond composite part was prepared by treating it with acid. This was done in two stages. Firstly, HCl/HF was used (other acids such as $H_2SO_4$ and $HNO_3$ can also be used) to roughen or etch the non-diamond portion of the join surface (i.e. mostly the exposed SiC). This was followed by treatment with hot (20-150° C.) chromic acid in order to remove substantially any graphite that might be present at the join surface and at the exposed diamond surfaces, in particular.

Coating

Three distinct layers of different materials were then applied in sequence onto the join surface. These are called for convenience i) the attachment layer, ii) the brazeable layer and iii) the oxidation resistant (braze compatible) layer. The attachment layer comprised TiC and was applied to a substantial portion of the join surface by means a conventional chemical vapour deposition (CVD) method known in the art. This resulted in the exposed diamond being coated by and chemically bonded to TiC layers. This layer needs to be sufficiently thick to form a strong bond (e.g. at least 0.1 micron, preferably at least 0.3 micron) and not so thick that it flakes off (e.g. less than about 5 microns). Subsequently, the so-called brazeable layer was applied to the join surface. The brazeable layer comprised a material formulation selected to bond well with the TiC attachment layer and was disposed onto the whole of the join surface, previously coated with TiC. In this example, tungsten metal was used as the brazeable layer because of its well-known affinity for being wet by molten brazes and its high melting point, which ensures that it will not be removed or deformed at an elevated temperature that might be required for subsequent brazing. Molybdenum is an alternative material suitable for the brazeable layer. The tungsten layer should be at least about 0.1 micron and less than about 20 micron, preferably it should be between 0.5 and 2 microns thick. A standard physical vapour deposition (PVD) method known in the art was used to deposit the tungsten layer.

Since materials typically suitable for use in the brazeable layer, such as tungsten and molybdenum may be prone to surface oxidation at brazing temperatures and may also by affected by the fluxes used with the brazes (which would reduce their wettability by molten brazes), a further layer comprising silver was deposited onto the brazeable layer in order to prevent these effects from affecting the brazability of the article. PVD was used to deposit the silver layer. Alternatively, a wet chemical silver deposition technique may be used.

Having carried out the above steps, the coated join surface was brazed to another part, in this instance a part made from cemented tungsten carbide although it will be appreciated that steel may also be used, using any of the brazing methods known in the art. For example, a conventional braze paste (Argobraze 49H from Johnson-Matthey) was applied to the join surface of a part comprising cemented tungsten carbide and subsequently the coated join surface of the diamond composite was brought into contact with this layer of braze paste. A high frequency induction coil was used to heat up this assembly until the braze melted and the braze was held in this molten state for about 10 seconds.

A 'push-off' test (i.e. "similar or greater strength") was used to examine the strength of bond created. A 'push-off' test means that the break is not exclusively confined to within the joining material or an interface, but includes fracture of the diamond composite material or component thereof.

As a way of testing the strength of the attachment of the ScD to sintered carbide, plates (24 mm×24 mm×3 mm) of ScD were chemically treated and coated as described above. Other plates were just coated without having been chemically treating. Cubes of carbide (5 mm×5 mm×3 mm) had some braze paste (49H) applied to the surface (about 1-2 mm thick). These were applied to the surface of the ScD plates and heated to melt the braze alloy and thus attach the carbide pieces to the ScD plates. These plates were then held in the jaws of an Instron testing machine while pushing off the carbide with another arm. The force is continuously measured on a computer. For the plates where no etching step was employed before coating, the force to break off was very low and almost unreadable by the Instron. In the case of the plates which were chemically treated according to the present invention, the strength of the ScD material was less than the bonding strength of the carbide to the plate which resulted in a portion of the ScD material underneath the carbide to break away from the plate.

The invention claimed is:

1. A method for joining a ceramic composite part, comprising at least one ceramic material and diamond material, to at least one other part, the method comprising the following steps:

treating a joining surface or surfaces of the ceramic composite part to increase the surface area of the joining surface of the ceramic composite part;

coating the treated surface or surfaces, or portions thereof, with a material comprising an attachment layer which is capable of bonding chemically to the diamond material and a brazeable layer, the attachment layer and the brazeable layer being applied in sequence onto the joint surface; and brazing the surface or surfaces thus treated and coated to the at least one other part through a braze;

wherein the attachment layer includes a carbide grown onto a portion of the diamond material or surfaces at the joining surface, the brazeable layer is comprised of a material formulation that includes a refractory metal selected from the group consisting of W, Mo, Cr, Ni, Ta, Au, Pt, Pd, Nb or any combination or alloy thereof, and the surface treatment is conducted in two stages, the first stage of the surface treatment comprising treatment with an acid or combination of acids such that exposed ceramic material at the joining surface or surfaces is roughened or etched, and the second subsequent stage being treatment with a second acid selected to remove graphite at the joining surface on any exposed diamond surface.

2. A method according to claim 1 wherein the brazeable layer is wettable by the braze, has a thickness of at least 0.1 micron and does not alloy substantially with the braze.

3. A method according to claim 1 wherein the braze is in the form of a paste.

* * * * *